United States Patent [19]
Burley

[11] Patent Number: 5,226,447
[45] Date of Patent: Jul. 13, 1993

[54] VALVE MALFUNCTIN DETECTION APPARATUS

[75] Inventor: Richard K. Burley, Reseda, Calif.

[73] Assignee: The United States of America as represented by the Administration of the National Aeronautics and Space Administration, Washington, D.C.

[21] Appl. No.: 957,127

[22] Filed: Oct. 7, 1992

[51] Int. Cl.$^5$ .............................................. F16K 37/00
[52] U.S. Cl. .................................. 137/554; 137/557; 116/70; 340/611
[58] Field of Search ............... 137/554, 557, 487.5, 137/599, 312; 116/70; 340/611

[56] References Cited

U.S. PATENT DOCUMENTS

| | | | |
|---|---|---|---|
| 3,517,692 | 6/1970 | Elrod | 137/557 |
| 3,901,178 | 8/1975 | Bermel | 137/557 |
| 3,963,043 | 6/1976 | Cota et al. | 137/557 |
| 4,043,355 | 8/1977 | Cerruti et al. | 137/557 |
| 4,161,962 | 7/1979 | Maringer et al. | 137/557 |
| 4,825,802 | 5/1989 | Le Bec | 137/557 |
| 5,057,822 | 10/1991 | Hoffman | 137/557 |

Primary Examiner—A. Michael Chambers
Attorney, Agent, or Firm—Robert L. Broad, Jr.; John R. Manning; Guy M. Miller

[57] ABSTRACT

A detection system is provided for sensing a malfunction of a valve having an outlet connected to an end of a first pipe through which pressurized fluid may be flowed in a downstream direction away from the valve. The system includes a bypass pipe connected at its opposite ends to the first pipe and operative to bypass a portion of the fluid flow therethrough around a predetermined section thereof. A housing is interiorly divided by a flexible diaphragm into first and second opposite chambers which are respectively communicated with the first pipe section and the bypass pipe, the diaphragm being spring-biased toward the second chamber. The diaphragm housing cooperates with check valves and orifices connected in the two pipes to create and maintain a negative pressure in the first pipe section in response to closure of the valve during pressurized flow through the first pipe. A pressure switch senses the negative pressure and transmits a signal indicative thereof to a computer. Upon cessation of the signal while the valve is still closed, the computer responsively generates a signal indicating that the valve, or another portion of the detection system, is leaking.

14 Claims, 1 Drawing Sheet

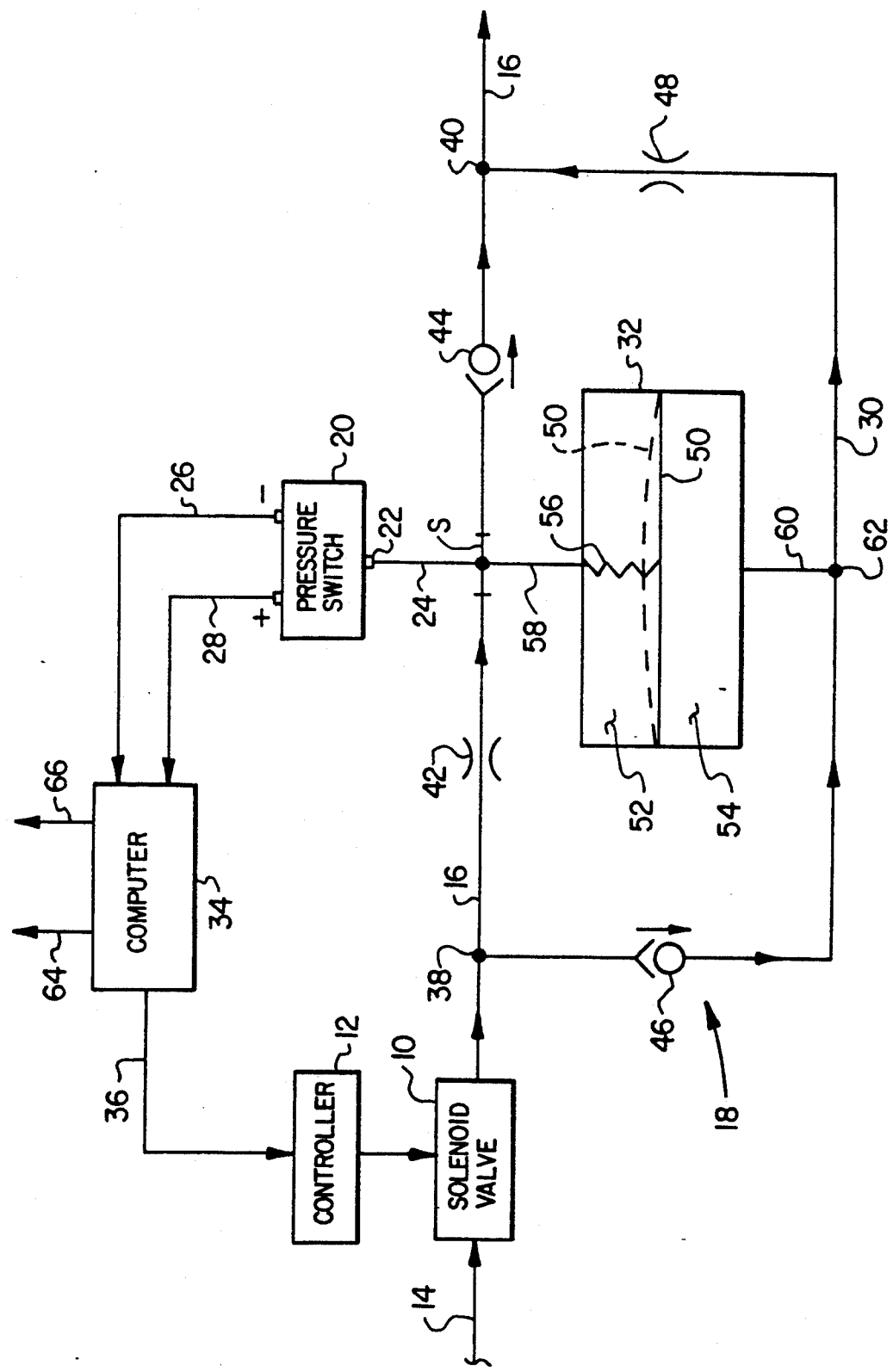

VALVE MALFUNCTIN DETECTION APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to fluid flow control apparatus, and more particularly relates to apparatus for detecting leakage or other malfunctions in a shutoff valve installed in a pipe through which pressurized fluid may be flowed.

2. Description of Related Art

Unattended control valve malfunctions, such as leakage, in pressurized piping systems in remote locations can often cause significant damage and attendant repair costs until detected. Such damage can be a quite serious when the remote piping system is handling environmentally and/or health sensitive chemicals. For example, in automated systems, valves which leak in their closed positions, or stick in their open positions, can cause major overflowing of chemical tanks with which they are operatively associated.

Various valve malfunction detection systems have been previously been proposed, but typically suffer from a variety of problems, limitations and disadvantages including, for example, size limitations, the inability to detect very small amounts of valve leakage, the inability to distinguish between valve leakage and the failure of a valve to open or close, mechanical and electrical complexity, and/or a lack of overall fail safe operation.

It is accordingly an object of the present invention to provide an improved valve malfunction detection system which eliminates, or at least substantially reduces, the above-mentioned problems, limitations and disadvantages typically associated with conventional valve malfunction detection systems.

SUMMARY OF THE INVENTION

In carrying out principles of the present invention, in accordance with a preferred embodiment thereof, a specially designed valve malfunction apparatus is incorporated in a fluid flow control system including a first pipe through which pressurized fluid may be flowed in a downstream direction from an end thereof, and a valve having an outlet connected to the end of the first pipe and being openable and closeable to respectively permit and preclude fluid flow through the first pipe in such downstream direction.

From a broad perspective the valve malfunction detection system comprises first means operative to create and maintain a negative pressure within a reference section of the first pipe in response to termination of pressurized fluid flow through the first pipe caused by closure of the valve; second means for sensing the pressure within the reference section and responsively generating a first signal while the sensed pressure is negative; and third means for generating a second signal, indicative of a malfunction of the valve, in response to cessation of the first signal.

In a preferred embodiment thereof, the valve malfunction detection system includes a bypass pipe; a pressure switch; first and second orifices; first and second check valves; a housing; and a computer, and the valve connected to the upstream end of the first pipe is a normally closed solenoid valve.

The bypass pipe is operative to divert a portion of the pressurized fluid flowing through the first pipe in a downstream direction around the reference section, and has a first end connected to the first pipe between the reference section thereof and the valve, and a second end connected to the first pipe downstream from its reference section.

The first orifice is connected in the first pipe between the valve and the reference section of the first pipe. The first check valve is connected in the first pipe downstream of its reference section and is operative to preclude fluid flow through the first pipe in an upstream direction. The second orifice and second check valve are connected in the bypass pipe, with the second check valve being positioned downstream from the second orifice and operative to preclude fluid flow through the bypass pipe in an upstream direction.

The housing is interiorly divided by a flexible diaphragm member into facing first and second chambers, with the diaphragm member being biased by a spring structure toward the second chamber. The interior of the first housing chamber is communicated with the interior of the first pipe reference section, and the interior of the second housing chamber is communicated with the interior of the bypass pipe at a location thereon disposed between the second orifice and the second check valve.

The pressure switch has a fluid inlet communicated with the interior of the first pipe reference section, and is operative to transmit a negative pressure signal to the computer during the presence of a negative fluid pressure within the first pipe reference section, and transmit a positive pressure signal to the computer during the presence of a positive fluid pressure within the first pipe reference section.

The computer is operative to selectively transmit a control signal to a controller which responsively opens the solenoid valve. Upon termination of the control signal the solenoid valve automatically closes. During receipt of the positive pressure signal from the pressure switch, the computer is also operative to generate a signal indicating that the solenoid valve is open.

While the solenoid valve is open, and pressurized fluid is flowing in a downstream direction through the first pipe and the bypass pipe, the first and second orifices operate to create a pressure differential across the housing diaphragm member which deflects it into the first housing chamber against the biasing force of the diaphragm spring structure. This deflection of the diaphragm member creates and maintains a positive pressure within the first pipe reference section, thereby causing the pressure switch to transmit its positive pressure signal to the computer.

Upon subsequent closure of the solenoid valve, the pressure differential across the diaphragm member subsides, thereby permitting the spring structure to drive the deflected diaphragm member back toward the second housing chamber. During this return movement of the diaphragm member the pressure within the first pipe reference section decreases until it is no longer positive, thereby terminating the positive pressure signal transmitted to the computer by the pressure switch.

Further spring-driven return movement of the diaphragm member causes the first and second check valves to close, and creates and maintains a negative fluid pressure within the first pipe reference section. During maintenance of this negative pressure, the pressure switch transmits its negative pressure signal to the computer.

If a leak occurs in the closed solenoid valve, or in either of the closed first and second check valves, the negative pressure in the first pipe reference section automatically dissipates to responsively terminate the negative pressure signal generated by the pressure switch. In response to cessation of the negative pressure signal, the computer generates an alarm signal indicative of valve malfunction, thereby permitting a rapid inspection and repair of the solenoid valve and/or the detection apparatus.

BRIEF DESCRIPTION OF THE DRAWING

The drawing is a schematic diagram of a valve malfunction detection system embodying principles of the present invention.

DETAILED DESCRIPTION

Schematically depicted in the drawing is a fluid flow control system including a normally closed solenoid valve 10 having an associated controller 12 electrically operable to selectively open and close the valve 10. An inlet pipe 14 and an outlet pipe 16 are respectively connected to the inlet and outlet of the valve 10 and are operative to receive a flow of pressurized fluid, in a rightward or downstream direction, when valve 10 is opened, such flow being terminated by closure of the valve.

In accordance with the present invention, the fluid flow control system is provided with a specially designed detection system 18 operative to detect a malfunction of the valve 10. The detection system 18 includes a pressure-to-electric switch 20 having a fluid inlet 22 communicated with the interior of a predetermined section S of the pipe 16 by a conduit 24. For purposes later described, the pressure switch 20 is operative to generate an electrical signal 26 during the time that the switch is sensing a negative fluid pressure within the pipe section S, and is operative to generate an electrical signal 28 during the time that the switch is sensing a positive fluid pressure within the pipe section S.

The detection system 18 also includes a bypass pipe 30, a housing 32, and a computer 34 disposed in a monitoring location remote from the balance of the fluid flow control system and operatively coupled to the pressure switch 20 to receive signals 26,28 therefrom. Computer 34 is operative to selectively transmit a signal 36 to the controller 12 to cause it to open the normally closed valve 10. Termination of the signal 36 permits the valve 10 to automatically return to its closed position.

The bypass pipe 30 has an upstream end 38 connected to the pipe 16 between the valve 10 and the pipe section S, and a downstream end 40 connected to the pipe 16 downstream from the pipe section S. During rightward flow of pressurized fluid through the pipe 16, the bypass pipe 30 functions to divert a portion of the pressurized fluid flow in a downstream direction around the pipe section S.

For purposes later described, an orifice 42 is connected in the pipe 16 between the pipe section S and the upstream end 38 of the bypass pipe 30; a check valve 44 is connected in the pipe 16 between the pipe section S and the downstream end 40 of the bypass pipe 30; a check valve 46 is connected in an upstream end portion of the bypass pipe 30; and an orifice 48 is connected in a downstream end portion of the bypass pipe 30. As illustrated by the arrows associated therewith, the check valve 44 precludes fluid flow in an upstream direction through the pipe 16, and the check valve 46 precludes fluid flow in an upstream direction through the bypass pipe 30.

Secured within the housing 32 is a flexible diaphragm member 50 that vertically divides the interior of the housing into an upper chamber 52 and a lower chamber 54. A schematically depicted spring structure 56 is connected between the diaphragm member 50 and the top wall of the housing 32 and downwardly biases the diaphragm member toward its horizontal solid line position shown in the drawing. The interior of the upper housing chamber 52 is communicated with the interior of the pipe section S by a conduit 58, and the interior of the lower housing chamber 54 is communicated with the interior of the bypass pipe 30 by a conduit 60 connected to the bypass pipe at point 62 between the check valve 46 and the orifice 48.

With the valve 10 opened in response to the computer generation of signal 36, and pressurized fluid flowing rightwardly through the pipe 16, a portion of the fluid flow is diverted in a downstream direction around the pipe section S through the bypass pipe 30 as previously mentioned. Due to the relative locations of the orifices 42 and 48 in the pipes 16 and 30, this parallel flow of pressurized fluid creates a pressure differential between the conduit connection point 62 and the pipe section S in a manner such that the fluid pressure within the lower housing chamber 54 is greater than the fluid pressure within the upper housing chamber 52.

This flow-created pressure differential across the diaphragm member 50 upwardly deflects it to its dotted line position, thereby creating and maintaining a positive fluid pressure within the interior of pipe section S and correspondingly causing the pressure switch 20 to transmit the positive pressure signal 28 to the computer 34. During the existence of the pressure switch output signal 28, the computer responsively generates a signal 64 which is indicative of the fact that the valve 10 is open and pressurized fluid is flowing through the system.

Upon termination of the computer control signal 36, and the resultant automatic closure of the valve 10, the pressure differential across the diaphragm member 50 begins to dissipate, thereby permitting the spring structure 56 to move the diaphragm member from its upwardly deflected dotted line position toward its horizontal solid line position. During an initial portion of this downwardly spring-driven diaphragm movement, the fluid pressure within the pipe section S ceases to be positive. The resulting termination of the pressure switch signal 28 and the computer signal 64 provides a monitoring indicia that the valve 10 has been closed.

Continued downward spring-driven deflection of the diaphragm member 50 to its solid line position causes the check valves 44,46 to close and creates a negative fluid pressure within the portion of pipe 16 between the closed valve 10 and the closed check valve 44, and the portion of the bypass pipe 30 between its upstream end 38 and the closed check valve 46. It can be seen that as long as there is no leakage in any of the valves 10,44,46 the diaphragm-created negative pressure within this portion of the piping system will be maintained since fluid cannot flow leftwardly past the check valve 44 or upwardly past the check valve 46 to dissipate this negative fluid pressure.

The negative fluid pressure within the pipe section S created as described above by the closure of valve 10 causes the pressure switch 20 to transmit the negative pressure signal 26 to the computer 34, thereby confirming that the valve 10 has been closed. In the event that the closed valve 10 (or either of the closed check valves 44,46) begins to leak, the internal pressure within the pipe section S will rise to the point that it is no longer negative, at which point the pressure switch negative pressure output signal 26 will automatically terminate.

In response to the cessation of signal 26, the computer 34 automatically generates an alarm signal 66 indicative of a valve malfunction. This automatic detection of valve malfunction permits the problem to be quickly investigated and remedied by repair personnel.

The detection system 18 of the present invention provides a variety of advantages over conventional valve monitoring systems. For example, the system 18 can be used in a variety of remote monitoring applications, for either liquids or gases, and is not size limited. Additionally, the system 18 can readily detect even a very small leak in a valve, and can detect whether a valve leaks, fails to open, or fails to close. The system 18 is a fail safe one since all component failures within the system are in a safe mode. For example, as mentioned above, if one of the two system check valves fails, the alarm signal 66 will be generated even if there is no malfunction of the controlled valve 10. Moreover, the detection system 18 does not rely on small, fouling-prone components or complex control structures, and is easy and relatively inexpensive to construct.

The foregoing detailed description is to be clearly understood as being given by way of illustration and example only, the spirit and scope of the present invention being limited solely by the appended claims.

What is claimed is:

1. Apparatus for detecting a malfunction of a valve having an outlet connected to a pipe through which pressurized fluid discharged from the valve outlet may be flowed in a downstream direction, said valve being openable and closeable to respectively permit and preclude pressurized fluid flow through said pipe, said apparatus comprising:

first means operative to create and maintain a negative pressure within a section of said pipe in response to termination of pressurized fluid flow through said pipe section caused by closure of said valve;

second means for sensing the pressure within said pipe section and responsively generating a first output signal while said pressure is negative; and third means for generating a second output signal, indicative of a malfunction of said valve, in response to cessation of said first output signal.

2. The apparatus of claim 1 wherein said first means are further operative to:

divert a portion of the fluid flow through said pipe around said section thereof while said valve is open, create a pressure differential between the diverted fluid and fluid flowing through said pipe section, and maintain said pressure differential, and utilize it to create said negative pressure, while said valve is closed.

3. The apparatus of claim 1 wherein said first means include:

bypass piping means connected to said pipe and operative during fluid flow through said pipe to divert a portion of the fluid flow around said pipe section, means for creating a pressure differential between fluid flowing through said pipe section and fluid flowing through a portion of said bypass piping means while said valve is open, and means for maintaining said pressure differential, and utilizing it to create said negative pressure, while said valve is closed.

4. The apparatus of claim 3 wherein:

said bypass piping means have an end connected to said pipe upstream from said section thereof, and said means for creating a pressure differential include a first orifice operatively connected in said pipe between said section thereof and said end of said bypass piping means, and a second orifice operatively connected in said bypass piping means.

5. The apparatus of claim 3 wherein:

said bypass piping means have an end connected to said pipe downstream from said section thereof, and said means for maintaining said pressure differential and utilizing it to create said negative pressure include a first check valve connected in said pipe, between said section thereof and said end of said bypass piping means, and operative to preclude fluid flow through said pipe in an upstream direction, and a second check valve connected in said bypass piping means and operative to preclude fluid flow therethrough in an upstream direction relative to said pipe.

6. The apparatus of claim 3 wherein said means for maintaining said pressure differential and utilizing it to create said negative pressure include:

a housing, a flexible diaphragm member operatively secured within said housing and interiorly dividing it into first and second opposite chambers, spring means for biasing said diaphragm member toward said second chamber, means for communicating the interior of said first chamber with the interior of said first pipe, and means for communicating the interior of said second chamber with the interior of said bypass piping means.

7. The apparatus of claim 1 wherein said second means include:

a pressure switch having a fluid inlet communicated with the interior of said section of said first pipe.

8. The apparatus of claim 7 wherein:

said pressure switch is operative to generate a third output signal indicative of the presence of a positive pressure within said pipe section.

9. The apparatus of claim 1 wherein said third means include:

computer means for receiving said first output signal and generating said second output signal in response to cessation of said first output signal while said valve is closed.

10. The apparatus of claim 9 wherein:

said valve is a normally closed solenoid valve, and said computer means are operative to selectively output a control signal useable to open said valve.

11. Fluid flow control apparatus comprising:

a first pipe through which a pressurized fluid may be flowed in a downstream direction from an end of said first pipe;

a valve having an outlet connected to said end of said first pipe, said valve being openable and closeable to respectively permit and preclude fluid flow through said first pipe in said downstream direction; and a detection system for detecting a malfunction of said valve, said detection system including:

means for sensing the fluid pressure within a section of said first pipe positioned downstream from said valve and responsively generating a first signal during the presence of a negative fluid pressure within said section of said pipe, means for generating a second signal, indicative of a malfunction of said valve, in response to cessation of said first signal while said valve is closed, a bypass pipe having a first end connected to said first pipe between said section thereof and said valve, and a second end connected to said first pipe downstream from said section thereof, a first orifice connected in said first pipe between said section thereof and said first end of said bypass pipe, a first check valve connected in said first pipe, between said section thereof and said second end of said bypass pipe, and operative to preclude fluid flow through said first pipe in an upstream direction, a second check valve connected in said bypass pipe and operative to preclude fluid flow therethrough in an upstream direction relative to said first pipe, a second check valve connected in said bypass pipe and operative to preclude fluid flow therethrough in an upstream direction relative to said first pipe, a second orifice connected in said bypass pipe downstream from said second check valve, a housing, a flexible diaphragm member operatively secured within said housing and interiorly dividing it into first and second opposite chambers, spring means for biasing said diaphragm member toward said second chamber, means for communicating said first chamber with said section of said first pipe, and means for communicating said second chamber with the interior of said bypass pipe between said second orifice and said second check valve.

12. The fluid flow control apparatus of claim 11 wherein said detection system further includes:

means for generating a third signal in response to the presence of a positive fluid pressure within said section of said first pipe.

13. The fluid flow control apparatus of claim 11 wherein:

said means for generating said second signal include computer means operative to receive said first signal and generate said second signal in response to cessation of said first signal while said valve is closed.

14. The fluid flow control apparatus of claim 13 wherein:

said valve is a normally closed solenoid valve, and said computer means are selectively operative to generate a control signal useable to open said valve.

* * * * *